United States Patent [19]
Seppa

[11] Patent Number: 5,918,288
[45] Date of Patent: Jun. 29, 1999

[54] TRANSMISSION LINE LOAD CELL PROTECTION SYSTEM

[76] Inventor: Tapani O Seppa, 39 N. Valley Rd., Ridgefield, Conn. 06877

[21] Appl. No.: 09/020,928

[22] Filed: Feb. 9, 1998

Related U.S. Application Data

[60] Provisional application No. 60/040,236, Mar. 11, 1997.
[51] Int. Cl.[6] .................................................. G01L 1/26
[52] U.S. Cl. ........................................................ 73/862.391
[58] Field of Search ........................... 174/106 R, 105 R; 73/862.471, 862.451, 862.391

[56] References Cited

U.S. PATENT DOCUMENTS

| | | | |
|---|---|---|---|
| 4,402,229 | 9/1983 | Byrne | 73/862.39 |
| 4,510,346 | 4/1985 | Bursh, Jr. et al. | 174/36 |
| 5,235,861 | 8/1993 | Seppa | 73/862.391 |
| 5,349,133 | 9/1994 | Rogers | 174/36 |
| 5,434,354 | 7/1995 | Baker et al. | 174/36 |
| 5,517,864 | 5/1996 | Seppa | 73/862.391 |

*Primary Examiner*—George Dombroske
*Assistant Examiner*—Jewel V. Thompson
*Attorney, Agent, or Firm*—Edward R. Hyde

[57] ABSTRACT

A system for monitoring the sag of a transmission power line. A tension measuring device is provided to the power line and a distant signal processing unit connects to the measuring device by a cable. A cable shielding arrangement is provided to protect the system from electrical transients.

2 Claims, 4 Drawing Sheets

TRANSMISSION LINE LOAD CELL PROTECTION SYSTEM

This application claims the benefit of U.S. Provisional Application No 60/040,236 filed Mar. 11, 1997, now abandoned.

BACKGROUND OF THE INVENTION

1. Field of The Invention

This invention relates to a system for monitoring the transmission capability of power transmission lines. More particularly the invention relates to an apparatus and method for determining the current carrying capacity of power lines which is limited by the allowable sag of the line between transmission towers. To control the load on a power line it is necessary to know the condition of the line in terms of the sags of the different spans. The present invention may incorporate the method and apparatus set forth in applicant's U.S. Pat. No. 5,235,861 entitled Power Transmission Line Monitoring System the disclosure of which is herewith incorporated by reference.

2. Description of the Prior Art

Certain problems associated with overhead power transmission lines regarding sag and clearance between the line and the nearest point on earth, are set forth in applicant's above cited prior patent. This patent also outlines prior art solutions to this problem and cites certain prior patents. The system for measuring power line sag between spans described in the said patent employs a novel tension monitoring system in which the line tension of the power line is measured and appropriate calculations are made as outlined in the patent in order to determine sag by which the person controlling the power line can appropriately adjust the load.

The tension measuring load cells will also detect other line conditions such as icing, annealing, galloping, creep, wind loads and other phenomena effecting line tension.

The tension measuring unit is conventionally a load cell including strain gages interposed in the power line span adjacent to a tower, that continuously measures the tension on the line. The strain gages are generally connected in the form of a Wheatstone bridge with two legs under tension and two under compression. An electrical signal is produced that may continually monitor the tension on the power line. This signal is transmitted over a cable to a remote electrical processing system located in an instrumentation console as shown and described in the applicant's prior patent.

The present state of the art has two significant problems. These are difficulties in the protection of load cells at locations where some circuits are energized during installation and maintenance and difficulties in protection of the load cells against electric overvoltages caused by lightning and other circuit transients.

Thus when a load cell is installed at a structure with energized circuits, the load cell is subject to electrical damage, because during the installation and maintenance, the cell cabling will be in a high voltage environment without a ground shield.

The second danger factor is that of atmospheric overvoltages and transients in the high voltage transmission circuit due to lightning or other causes. Because a load cell body is electrically connected to the structure, the body is at the same potential as that of the location of its attachment, while the strain gages forming the bridge elements of the load cell are connected to and have the same potential as the measuring equipment. Because the load cell bodies and the measuring equipment are joined by a common ground wire (along the transmission structure) they remain at the same potential under normal 60 Hz operating conditions.

It is to the solution of these problems that the present invention is directed.

SUMMARY OF THE INVENTION

The invention overcomes the problems and disadvantages of the above discussed prior art by providing appropriately grounded double shielding of the instrumentation cable which connects the load cell to the distantly located instrumentation console.

Accordingly it is a primary object of the present invention to provide a transmission power line system having a tension monitoring unit and a distantly located instrumentation console with protection against damage due to energized transmission circuits and electrical transients.

BRIEF DESCRIPTION OF THE DRAWINGS

The foregoing and still other objects and advantages of the present invention will be more apparent from the following detailed explanation of the preferred embodiments of the invention considered in connection with the accompanying drawings herein in which.

DESCRIPTION OF A PREFERRED EMBODIMENT

Figure 1:
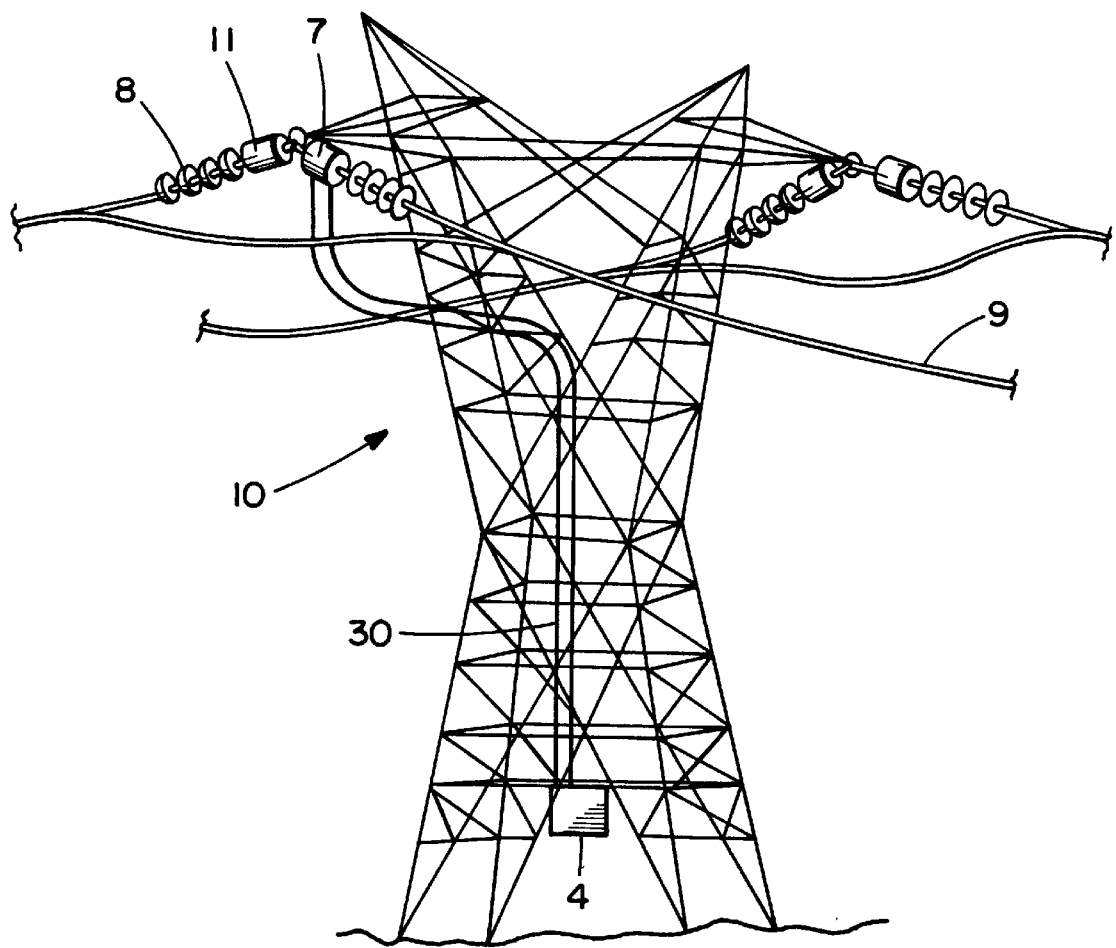
FIG. 1 is a view of a transmission tower having electrical power transmission lines showing the arrangement of a tension measuring load cell and console of electrical processing units.

Referring now to the drawings and more particularly to FIG. 1, 10 indicates a transmision power line tower to which a power line such as 9 is secured. The power line is connected to the tower 10 through strain insulators 8 and load cell 7. As disclosed in the above cited patent and hereinafter described, the load cell serves to monitor the tension of the power line and develop an electrical signal function of the power line tension. This signal is passed to a console 4 over a cable 30.

Figure 2:
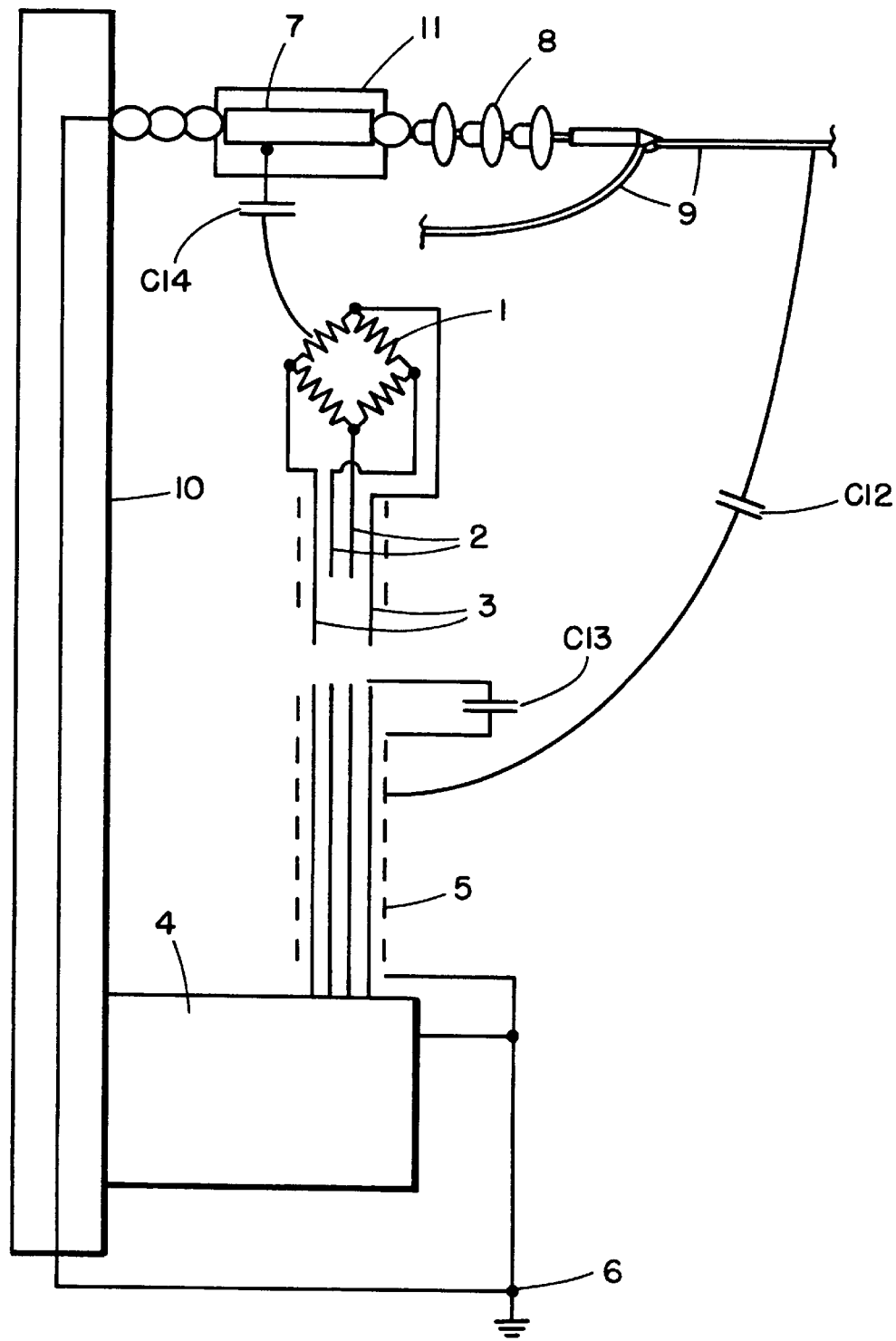
FIG. 2 is a schematic transmission power line protection system of the prior art.

Referring now to FIG. 2, there is shown a schematic of the tension monitoring system and it is seen in that the power line 9 is secured to the tower 10 through a load cell surrounded by a shield 11. The strain gauges 1 which may have a nominal resistance of about 350 ohms are connected as a Wheatstone bridge having two bridge legs under tension and two under compression. The strain gauge is connected to the processing equipment in console 4 over the cable which has two wires for the excitation and two wires 3 for the output signal surrounded by an electric shield 5.

The details of the strain gages and load cells do not form part of the present invention and it has been found that the commercially available Revere USP unit works very satisfactory for this system. The bridge elements cannot be grounded at the load cell body because this would cause circulating currents which make accurate measurements of loads impossible and could endanger the circuit elements.

Thus the shield 5 is grounded at 6 which is the same point at which the console 4 is grounded. It is understood that the bridge elements of the strain gauge are physically located within the electrical shield of the load cell but are not electrically connected to the shield or to the load cell body.

The typical coupling capacitance between the shield 5 and the high voltage conductor is 0.2–1.0 nF and is represented by C12. The capacitance between the wires 2, 3 of the bridge and the shield 5 is at least one magnitude higher than this capacitance, typically between 10 and 1000 nF shown in FIG. 2 as C13. The capacitance C14 of the load cell bridge elements 1 to the load cell body 7 is typically about 1–10 nF. The potential difference between the transmission line 9 and grounded load cell body 7 is typically 69–500 kV. Bridge elements 1 are galvanically connected to excitation and signal wires 2, 3 of the load cell cable and coupled capacitively through insulation capacitance C14 to the grounded load cell body 7. The capacitance C13 between the cable shield 5 and load cell wires 2, 3 is much larger than capacitance C12 between the shield and the high voltage conductor. Thus the voltage over the capacitance C12 will be approximately C12/C13 x voltage between the transmission line 9 and load cell body 7.

Figure 3:
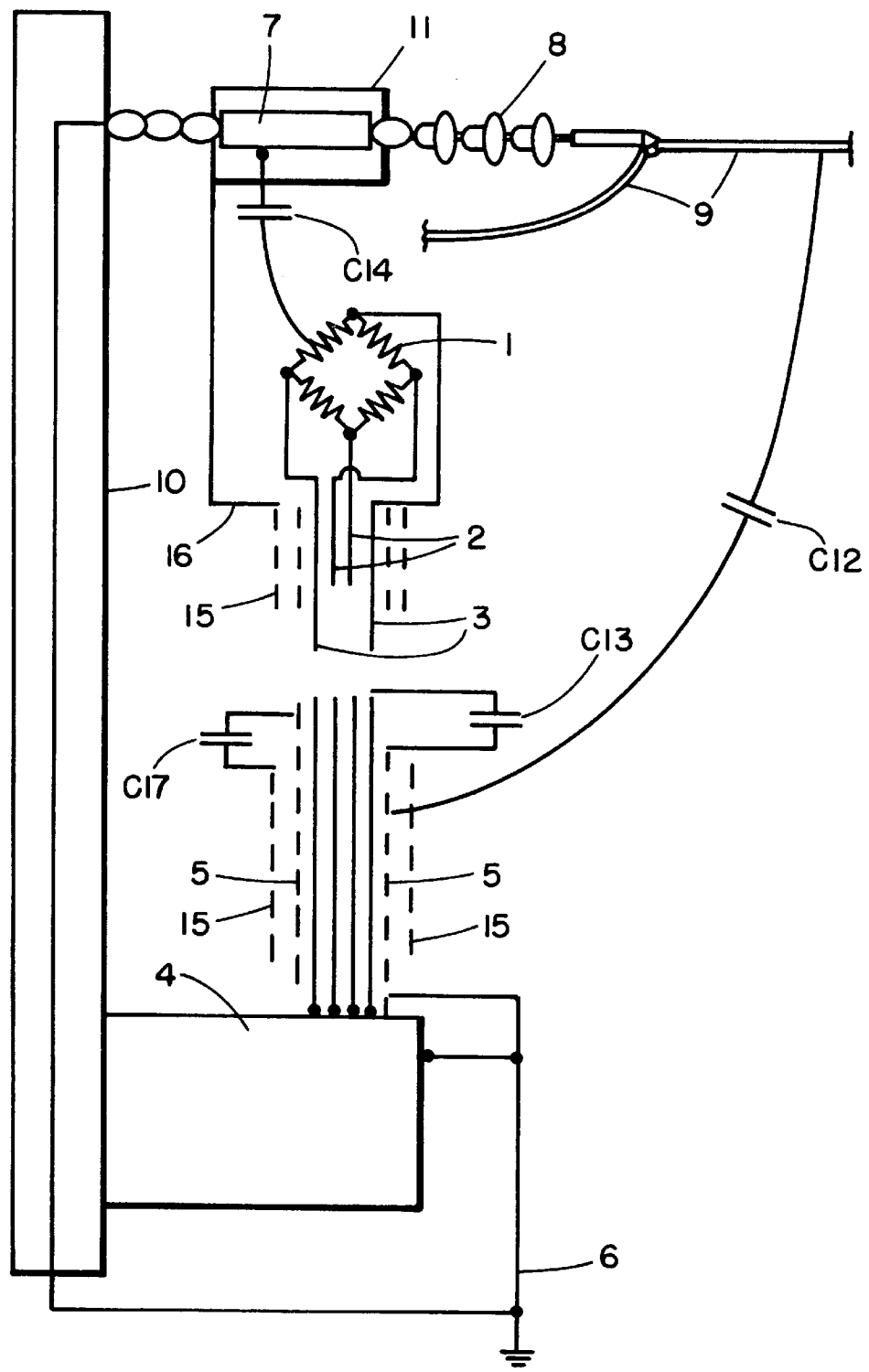
FIG. 3 is a schematic transmission power line protection system of the present invention.

FIG. 3 shows the system of the present invention in which the cable has two shields 5 and 15. The inner shield 5 is grounded to the instrumentation enclosure 4 and the outer shield 15 is galvanically connected to the load cell body 7 and the load cell enclosure 11.

When the load cell is installed on a structure where circuits are energized, the outer shield 15, which is connected to the grounded load cell body 7, shields the inner shield 5 and the load cell wires 2, 3. Thus, no voltage can be electrostatically induced in the inner shield 5 or the load cell wiring 2, 3.

When the load cell is connected to the measuring instrumentation 4, the inner shield 5 is grounded to the instrumentation console 4. This provides a uniform shielded potential to the measuring circuits 2, 3. At the same time, the insulation between the outer and inner shields prevents any 60 Hz circulating currents between the measuring equipment and the load cells.

Figure 4:
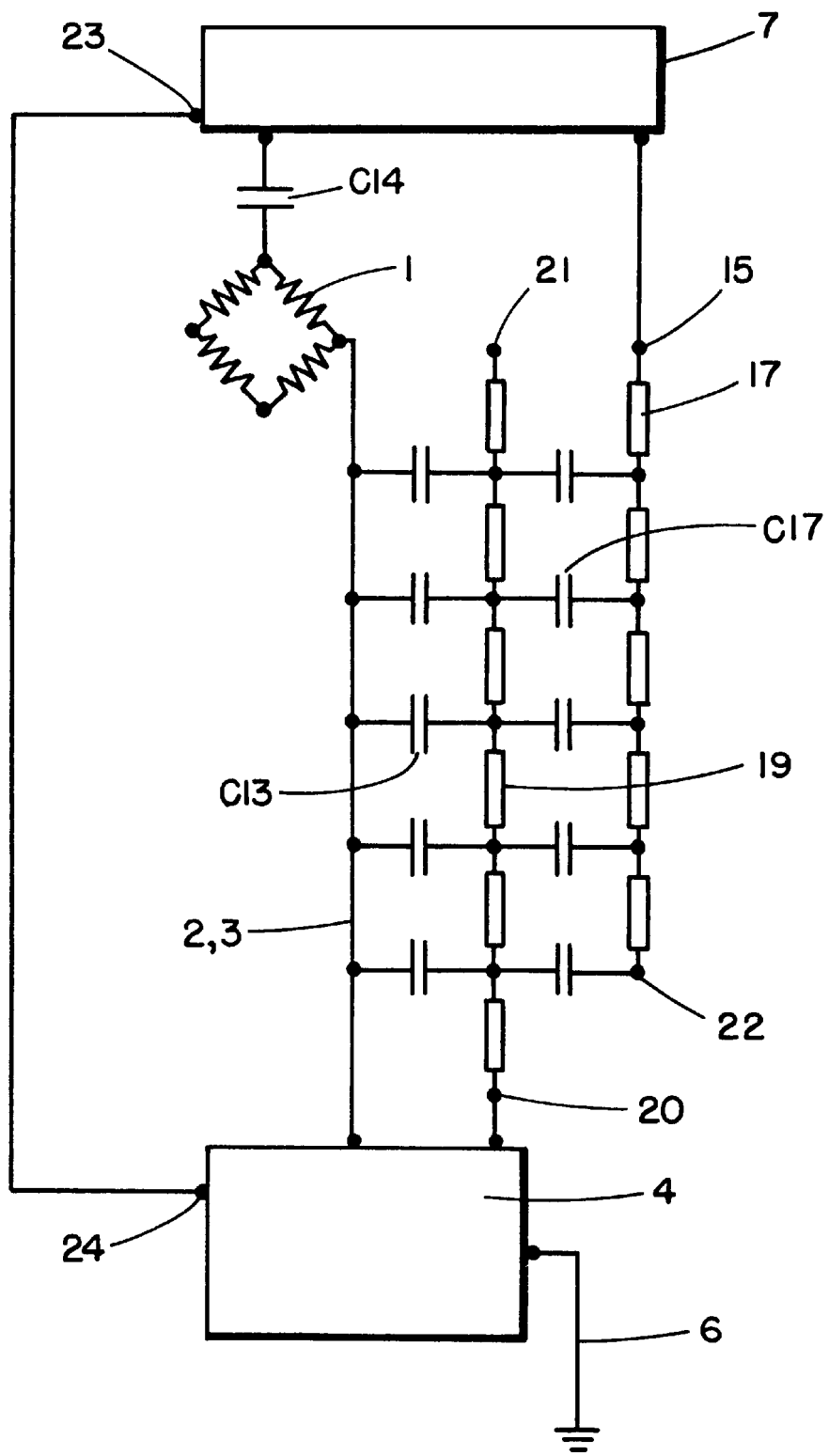
FIG. 4 is a schematic diagram explanatory of the system of FIG. 3.

FIG. 4 illustrates how the double shielding protects the load cells during electric transient conditions. The load cell body 7 is electrically connected to the transmission structure. The load cell bridge elements 1 have a capacitance C14 to the load cell body which is much smaller than the distributed capacitances C17 between the outer and inner shield and capacitances C13 between the load cell wires 2, 3 and the inner shield. When a transient voltage occurs at the junction of the load cell body and the outer shield 15, it will start traveling along the outer shield at the speed of light toward ground. For transient conditions, the shield and wire elements can be described by longitudinal inductive elements 17, 19 and transverse capacitive coupling elements C13, C17. Because of the high capacitances of C13, C17, the load cell wires, 2, 3 and strain gage elements 1 will remain at essentially the same potential as the load cell body 7, eliminating or greatly reducing the likelihood of electrical failure of the capacitance C14, representing the insulation of the load cell elements.

Consider a load cell mounted at a distance of 50 ft. from measuring equipment console, shown in FIG. 4 as the distance between points 23 and 24. The length of the load cell cable between points 20 and 21 may be 80 ft. If the outer shield is continuous for the full 80 ft. distance, then at the time when the transient voltage wave reaches the instrumentation at point 24 and continues along the inner shield from point 20 towards point 21, the wave traveling from point 16 along the outer shield is still 30 ft. away from the instrumentation, point 20. The transient voltage of the outer shield is reflected, with reverse polarity, at the time it arrives at the end of the cable. It will travel up the outer shield, also being induced to the inner shield and bridge wiring.

To reduce the reflection in an optimal way, the outer shield 15 is left open circuited at a point 22 which is one half of the difference between the distances 23 to 24 versus 16 to 20. The length of the outer shield is 65 ft., which the length of the inner shield is 80 ft.

Having thus described the invention with particular reference to the preferred forms thereof, it will be obvious that various changes and modifications may be made therein without departing from the spirit and scope of the invention as defined in the appended claims.

What is claimed is:

1. A system for determining the tension of an overhead transmission power line section comprising:

a section terminal transmission tower;

a transmission power line section having a terminal end connected to said tower;

Tension measuring means connected to the transmission section and to said tower to produce electrical signals representative of the power line tension;

console means located a distance from said tension measuring means;

electrical signal provessing means located within said console;

electrical cable means connected to the tension measuring means and to said electrical signal processing means;

first electrical grounding means located at the said console means to electrically ground the console means;

second electrical grounding means located at the tension measuring means a distance from the console means to ground the tension measuring means;

first electrical shield means surrounding said electrical cable means and connected to said first electrical grounding means and console; and second electrical shield means surrounding said electrical cable means and connected to said second electrical grounding means and said tension measuring means.

2. The system defined in claim 1 in which said second electrical shield means surrounds said first electrical shield means.

* * * * *